June 19, 1956
H. VOORTMANN
2,751,192
SPADE
Filed Jan. 19, 1951
4 Sheets-Sheet 1
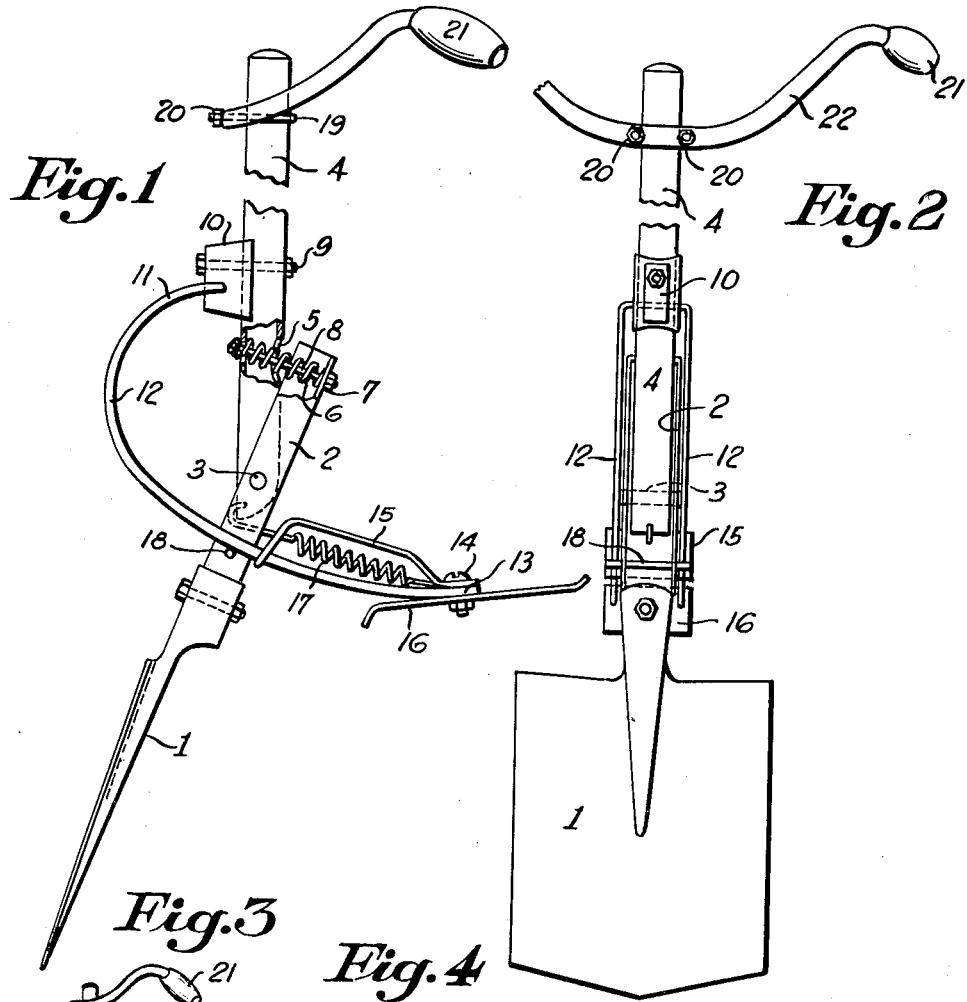
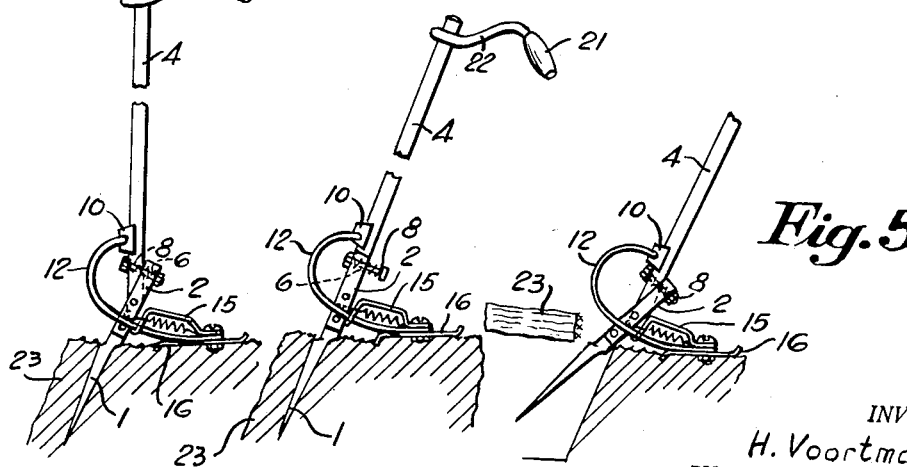
INVENTOR.
H. Voortmann
BY Richards & Geier
ATTORNEYS June 19, 1956
H. VOORTMANN
2,751,192
SPADE
Filed Jan. 19, 1951
4 Sheets-Sheet 2
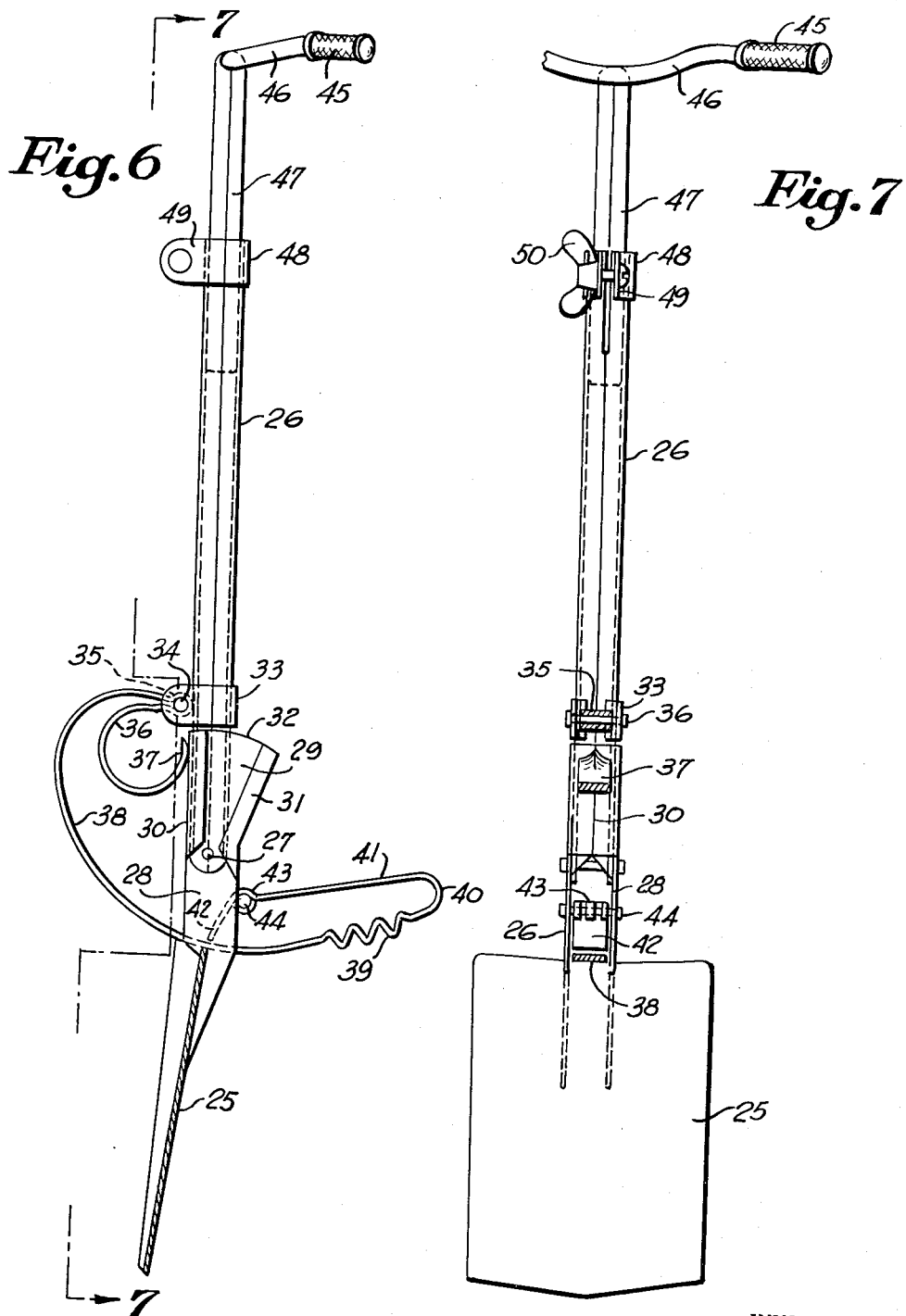
INVENTOR.
H. Voortmann
BY
ATTORNEYS

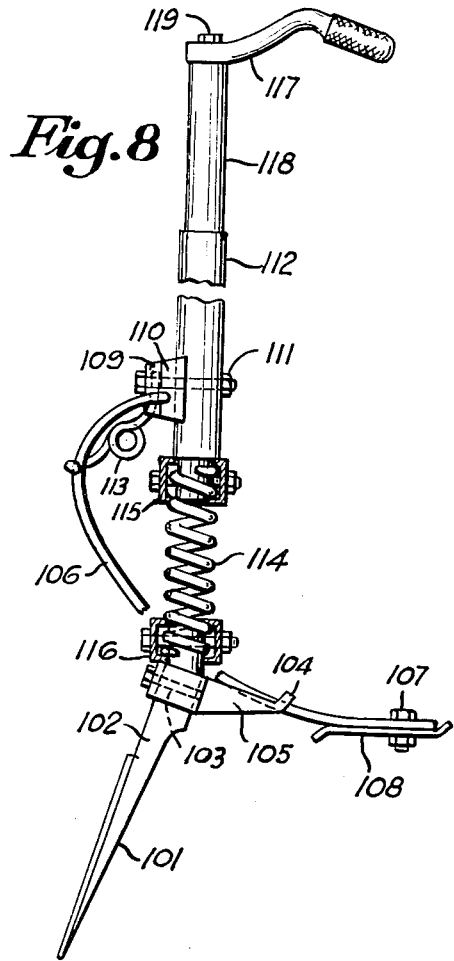
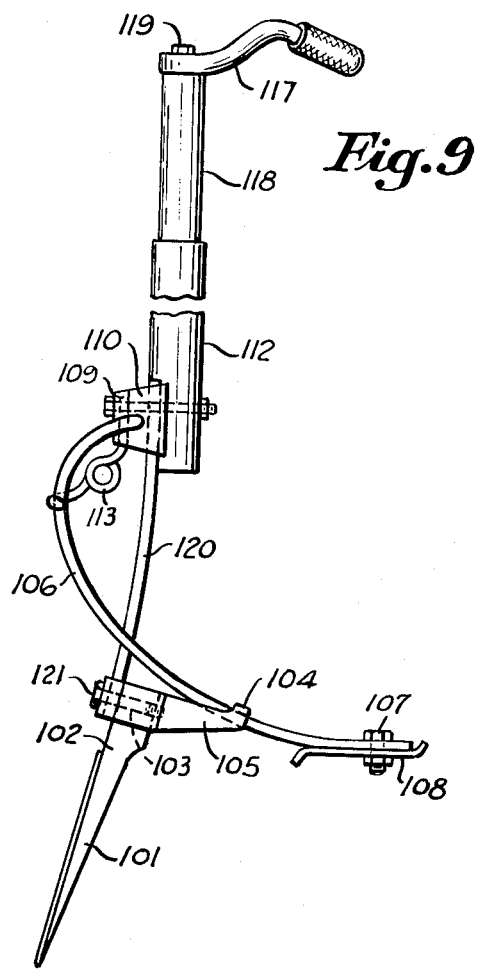
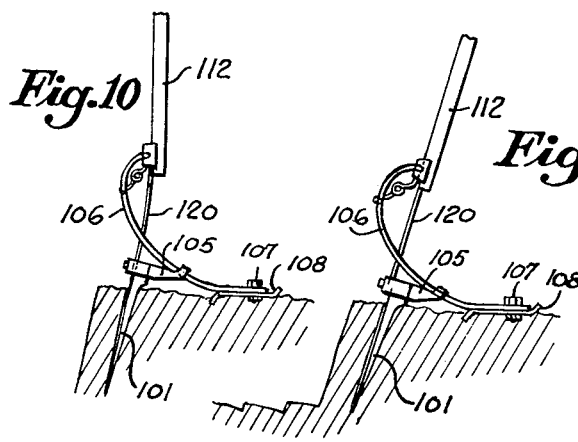
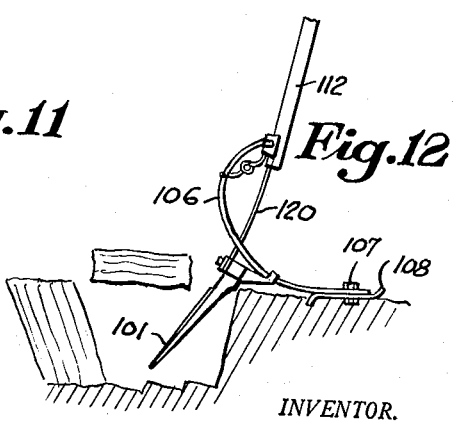

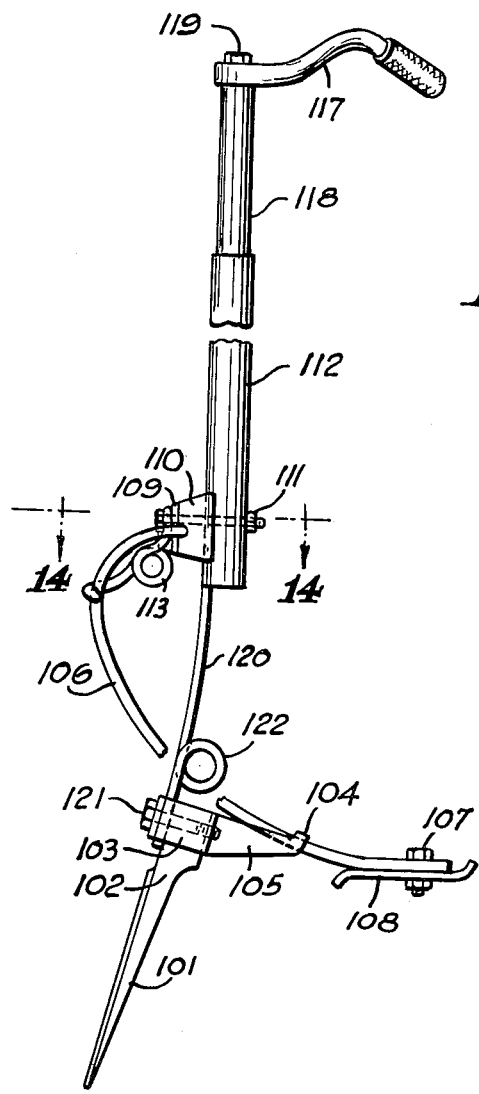
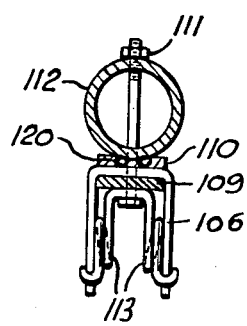

United States Patent Office 2,751,192
Patented June 19, 1956

2,751,192

SPADE

Heinrich Voortmann, Sarrebruck, Saar Territory, assignor to Wolf Geraete, St. Wendel, Saar Territory, a limited liability company of the Saar Territory Application January 19, 1951, Serial No. 206,738

12 Claims. (Cl. 254—131.5)

The present invention has for its object a novel spade adapted to reduce to a substantial extent the expenditure in human labor involved in digging, with reference to that required with prior spades on the market.

There have been made many propositions and experiments in order to make this part of conventional manual digging less tiring either through additional implements associated with ordinary spades or else through a particular execution of the spade itself. Such auxiliary arrangements have, however, found no development in practice as their application has not actually led to the desired alleviation of the digging operation.

Another object of the present invention is to provide a spade wherein, in contradistinction with all prior propositions, the spade blade is no longer rigidly connected with the shank, but is capable of rocking under the action of a spring with reference to said shank round a rigid or adjustable horizontal shaft. To this end, the spade blade provided with a short projecting stud is pivotally connected with the lower end of the spade shank under control of elastic members or else simply with the interposition of elastic means.

Through this arrangement, it is possible, for the first time, to cut out the transverse work necessary heretofore when cutting the clod of earth, projecting the cut clod forwardly and turning it over with a special straining of the muscles in the operator's back. According to the invention, this work is obtained through the sudden release of special elastic members engaging the spade blade, said elastic members being tensioned through a large lever arm, in other words, with a reduced application of power as provided through a mere rocking of the spade shank.

When a horizontal pivotal axis constituted for instance by a rod, is arranged between the spade blade and the spade shank, the spring power urging the blade into a position with reference to the shank that corresponds substantially to the inoperative position of standard rigid spades, is applied in the direction of a stop against which the two parts forming the spade are held operatively through tractional or compressional coil springs engaging suitably selected lever arms. In order to make the spade suit the different specific weights of the various grounds that may be worked, there are provided special adjusting means such as threaded rods and the like, through which the tension of the springs that are possibly enclosed inside a protective sheath, may be modified. On the other hand, the pivotal connection between the two portions of the spade may be provided according to the invention directly through the elastic means constituted by one or more blade springs of suitable size or through a coil spring having its axis directed substantially in parallelism with the axis of the spade shank or else through two or more springs of round wire arranged side by side. Through a suitable selection of the shape and arrangement of the springs forming the pivotal connection between the said spade blade and shank, it is possible to act on the rocking movement to be executed by the blade with reference to the shank and consequently with reference to the edge of the cut in the ground.

To the spade shank is also pivotally secured, according to my invention, a supporting member serving both as an abutment and as a ground-engaging member and also as a foot rest when engaging the blade into hard ground, said supporting member being provided on the rear surface of the blade facing the user. This supporting member is advantageously submitted to the action of a weak elastic element such as an auxiliary return spring or else it is itself constituted by an elastic member so that it may return automatically into its operative position on the rear side of the spade blade. In addition thereto, the supporting member is advantageously constituted in an elastically yielding manner, either through its structure or through the association therewith of elastic members in a manner such that when removing a cut-out clod of earth by raising, as required, the spade blade, said supporting member may produce an additional acceleration on the blade and on the clod cut out by the latter, whereby the turning of the upwardly projected clod of earth by about 180° is furthered.

It is particularly of advantage to design the supporting member so that it may be constituted by an elastic fork of iron pivotally secured through its apex to the spade shank, the plate or the like member serving as a foot rest being secured to the free ends of the arms of said fork located behind the spade blade. It is possible to prevent any bending stresses that might reduce the life of such an elastic fork, as may arise through engagement of the spade blade into hard ground, by providing on the upper supporting projection of the spade blade a further rearwardly directed projection the end of which serves as a bearing for the arms of the elastic fork in the immediate vicinity of the foot rest plate or else said ends may actually form such a foot rest plate.

Whereas in the case of a pivotal connection operating through a horizontal axis between the spade blade and the spade shank, the two terminal angular positions of the blade with reference to the shank are defined through more or less rigid abutments or the like, it is possible, when such a pivotal connection is omitted, as in the case of the provision of an elastic deformable intermediary member between the blade and the shank, to cut out such abutments for a suitably rigid constitution of the elastic members, whereby the operation of the blade may be performed without any jerks and consequently with a still further reduced strain.

The use of an elastic steel wire bent into a double arm horn shape as an intermediary securing member for the rockable supporting member on the blade shank provides necessarily the advantage that the ground plate engaging to the rear of the spade blade, ground that has not yet been touched, may match automatically any unevennesses of the ground surface without hindering thereby the proper operation of the spade.

Instead of the double arm steel wire spring with a return spring, it is also possible to use a suitably bent and correspondingly sized prestressed blade spring playing simultaneously the part of each of the following members:

(i) an elastic member between the blade and shank of the spade, (ii) an elastic intermediary member between the spade shank and the ground plate of the supporting member, (iii) the actual supporting member, (iv) the foot rest for furthering the engagement of the blade into hard soil, (v) the spring for returning the supporting member into its starting position.

In order to obtain as long a life as possible for the elastic member ensuring the forward projection of the spade blade, it is possible to substitute for the spring that should be of substantially large size and strength and should be comparatively rigid and is thereby easy to break; a plurality of spiral springs operating under compression and submitted to a certain preliminary stress, said springs being held through one or more rods or the like that serve also for limiting the angular rocking movement of the blade with reference to the shank of the spade.

The spade according to the invention may be a spade to be used with one hand or else a spade to be held by both hands through association with a handle formed in the manner of a bicycle handle bar, whereby the blade may easily be adjusted in a manner similar to such handle bars to suit the size of the operator actually handling it, through a modification in height of the handle or handles.

The operation of the spade according to the invention is made substantially easier through the fact that the movement of the spade blade towards the next point of engagement is furthered by the action of the component of the movement of the blade directed upwardly immediately after the projection of the clod and the result of which is an apparent reduction in weight.

To this end, the spade including a more or less rearwardly sloping shank is shifted transversely through a movement round the foot rest of the supporting member resting on the ground so that it is sufficient to provide a return movement requiring but little power before further engagement with ground.

The following description referring to accompanying drawings gives all details relating to the invention as incorporated in various embodiments, said drawing illustrating such embodiments with certain structural details. In said drawings:

Figs. 1 to 7 illustrate two embodiments of a spade according to the invention in which the spade blade is connected with the shank through a horizontal pivotal connection.

Figs. 8 to 14 illustrate various further embodiments of such a spade wherein the blade is connected with the shank through an elastically deformable intermediary member.

The different figures are more precisely as follows:

Fig. 1 is a side view of a spade wherein a coiled compressional spring is inserted between the blade and the shank of said spade.

Fig. 2 is a front view of the spade according to Fig. 1.

Figs. 3 to 5 are a diagrammatic side view of the spade illustrated in Figs. 1 and 2 for three different operative stages thereof, to wit, respectively immediately after engagement with the ground, at the end of the rearward movement of the spade shank and immediately after the upwardly directed projection of the clod cut out of the ground.

Fig. 6 shows a further embodiment of the spade in side view.

Fig. 7 is a front view of the spade illustrated in Fig. 6, said view being partly a cross-section through the front part of the spring along the vertical section line VII—VII of Fig. 6.

Fig. 8 is a side view of a spade with an intermediary member formed by a spiral spring connecting the spade blade with the spade shank.

Fig. 9 illustrates a further embodiment of the spade wherein the elastic intermediary member between the blade and the shank is constituted by two parallel round wire-springs.

Fig. 10 is a side view on a smaller scale of the blade shown in Fig. 9 directly after engagement with the ground.

Fig. 11 is a side view of the same spade at the end of the rearwardly directed pivotal movement of the spade shank.

Fig. 12 is a side view of the same spade directly after projection of the previously cut out clod of earth.

Fig. 13 illustrates a modification of the embodiment illustrated in Fig. 9 according to which the round steel wires are bent immediately above the blade to form an eye.

Fig. 14 is a horizontal cross-section through line XIV—XIV of the spade illustrated in Fig. 13 on a larger scale.

The upper end of the spade blade 1 (see Figs. 1 to 5) is provided with a short projection constituted preferably by a metal pipe section 2 connected in its turn through the pivot 3 with the lower end of the spade shank 4 constituted by a metal tube.

The projection 2 on the blade 1 has a U-shaped outline and surrounds, as illustrated in Figs. 1 and 2, the lower end of the spade shank 4 constituted, as disclosed, by a tube and provided at its rear with a recess 5 at a level registering with the upper end of the projection 2. This recess 5 houses one end of a coil spring 6, the other end of which engages the upper end of the projection 2, said spring surrounding a threaded rod 8 carrying at each end a securing nut 7. The threaded rod 8 limits the angular rocking movement of the upper projection 2 on the blade 1 with reference to the shank 4 within a range of 45° and subjects simultaneously the spiral spring 6 operating under compressional conditions to a predetermined preliminary tensioning.

To the front side of the shank 4 is secured a bearing member 10 through the agency of a locking screw 9 passing through said shank and bearing member, the latter being constituted for instance by a suitably shaped metal sheet or the like.

Said bearing member 10 carries revolubly the horizontal medial portion 11 of an elastic fork 12 comprising two arms bent into horn shape. The ends 13 of the two arms of said spring fork 12 are secured to the metal sheet 15 serving as a foot rest and to the ground-engaging plate 16 through common locking screws 14 as illustrated in Fig. 1 and said plate 16 engages firmly the ground through its downwardly directed front end and through the tip or lower end of the locking screw 14. The front of the foot-rest 15 is bent downwardly and engages the arm 13 of the elastic fork 12. The foot-rest 15 forms also an abutment on the supporting member constituted by the parts 12 to 16 and held fast in its inoperative position illustrated in Figs. 1 and 3 by the weak coil spring 17 acting tensionally and located underneath the foot-rest, said spring 17 connecting the locking screw 14 with the lower end of the spade shank 4.

In their inoperative position, the arms of the elastic fork 12 are positioned as illustrated in Fig. 1 and engage the studs 18 carried laterally upon either side of the projection 2 on the spade blade. As the elastic fork 12 assumes a substantially considerable stiffness, it provides at the setting of the foot on the foot rest 15 a sufficiently rigid connection between the foot rest 15 on one hand and the spade blade 1 on the other. The stiffness of the elastic fork arms above the studs 18 can be increased through vertical metal sheets that are not illustrated and the lower edges of which may engage and surround said elastic arms.

At the upper end of the spade shank 4 is secured, through the agency of a securing collar or strap 19 and the nuts 20 screwed over the ends of the latter, a control rod 22 provided with two handles 21 and somewhat similar to a bicycle handle bar. Said control rod may be adjusted after release of the nuts 20 so as to assume any desired level with reference to the blade shank 4.

The operation of the spade appears readily from inspection of Figs. 3 to 5. Fig. 3 is a diagrammatic view of the spade after introduction of the blade 1 into the ground that is to be worked, the ground-engaging plate 16 of the supporting member being then in contact with the surface of the ground. The coil spring 6 operating under compressional conditions is then in its normal prestressed position while the elastic fork 12 is somewhat tensioned according to the intensity of pressure exerted in a vertical direction through the spade shank.

This being done, the shank 4 of the spade is rocked towards the operator whereby on one hand the coil spring 6 submitted to compressional stresses is compressed and on the other hand, after the supporting member has been urged by a slight forward movement of the shank into preliminary engagement with the rear side of the spade through the agency of the tractionally stressed coil spring 17 operating under tension, the horn-shaped front portion of the fork 12 is simultaneously tensioned through a bending of its arms as illustrated in Fig. 4. This rocking movement of the spade shank being continued rearwardly, a moment comes for which the power stored in the compressed coil spring 6 is sufficient for tearing out the clod 23 lying in front of the ground-engaging blade 1 and releasing it from the surrounding ground; consequently the expansion of the compressed coil spring 6 rocks the blade 1 round the pivotal axis 3 in the forward direction and simultaneously the elastic power stored in the strap or fork 12 is released.

The upwardly and forwardly moving blade 1 produces a forward projection of the clod 23 into a parabolic path the apex of which corresponds to the position illustrated in Fig. 5 beyond which the clod drops in the desired manner on the opposite side of the ditch that is being cut.

In the embodiment illustrated in Figs. 6 and 7, the members 5 to 17 of the embodiment of Figs. 1 to 5 form a single member made of a suitably shaped blade spring. This leads to the advantage that the spade is as a whole substantially stronger and simpler in its execution, whereby it is possible to use it reliably without exercising as much care in its upkeep and operation.

To the spade blade 25 is secured instead of the usual shank, a flat projection flaring upwardly after the manner of a hopper and constituted by iron sheet members connected through weld lines. To this flaring projection is pivotally secured the four-sided spade shank 26 through the agency of the pivot 27 so that it may execute a limited oscillating movement with reference to the spade blade 25.

The hopper-shaped flaring projection connecting the spade blade 25 with the spade shank 26 comprises two downwardly tapering parallel iron sheets 28 secured to the rear side of the blade and assuming a suitable size, said sheets widening at their upper ends 29 to form a kind of trapeze. The front and rear edges of the trapeze-shaped parts are bent inwardly at an angle of about 45° and are welded together along their contacting edges 30 and 31.

There is thus obtained a downwardly tapering socket assuming the shape of a hopper with a six-sided cross-section and inside which the lower end of the four-sided hollow spade shank 26 may rock round the pivot 27 within an angle defined by the angular space separating the edges 30 and 31.

Above the upper edges 32 of the projection on the spade blade, there is provided a collar 33 between the two forwardly directed free ends of which is held a pivot for the eye or loop 35 of a two-arm blade spring 36—38. The shorter arm 36 of this blade spring is bent downwardly and rearwardly along an arcuate line and rests through its angularly bent end 37 against the upper end of the front edges 30 of the hopper-shaped socket on the spade blade. The longer outer arm 38 of the blade spring is bent also downwardly and rearwardly into the form of a horn and passes through the gap provided between the two flat iron member 28 beyond which it engages the rear surface of the spade blade 25.

At 39 the blade spring forming the supporting member includes a ground-engaging part that assumes a wavy shape as obtained through stamping, said shape ensuring a better engagement with the ground. Behind said stamped wave-shaped part 39, the blade spring is bent at 40 into a forwardly directed hairpin-shape so as to form with its further portion 41 a foot rest furthering the engagement of the spade into hard ground. In order to exclude thereby the somewhat disturbing elasticity of the spring blade, the end 42 of the spring blade is bent obliquely and extends substantially at a point of the surface of the spade blade 25 towards the upper surface of the lower arm 38 of the blade spring.

At the point 43, the free end of the blade spring is secured to a transverse stud 44 that is caused to bear against the rear edges of the flat iron sheet members 26 by the short arcuate arm 36 of the spring blade submitted to a preliminary tensional stress.

The operation of this modified embodiment of the spade is the same as that disclosed with reference to the embodiment illustrated in Figs. 1 to 5.

After the spade blade has been urged into ground while the position of the blade spring is that illustrated in Fig. 6, the spade shank 26 is rocked rearwardly whereby the outer arm 38 of the blade spring is tensioned with reference to the other arcuate arm 36 of said blade spring. As soon as the rear edge of the spade shank 26 has been brought into contact with the rear inner edge 31 of the blade socket through a rearward rocking movement, i. e. as soon as the clod that has been cut out of the ground has been released from the surrounding ground, said clod is projected forwardly in the manner disclosed already with reference to Fig. 5 whereby the blade spring is returned into the position illustrated in Fig. 6.

In order to provide for a vertical adjustment of the transverse rod 46 provided with two handles 45, a four-sided tube 47 guided inside the four-sided spade shank 26 carries the transverse rod 46, and the adjustment with reference to the shank 26 is obtained through a collar 48 the free ends 49 of which are tensioned through the wing nut 50.

The spade blade 101 illustrated in the embodiment of Figs. 8 to 14 is provided with a shoulder 102 to which is secured e. g. through welding or the like, a fork-shaped collar member 103 (Fig. 8). The hook-shaped outwardly flaring ends 104 of the arms 105 of the fork-shaped collar member 103 serve, when the blade is caused to enter hard soil, as abutments for the arms of the horn-shaped fork spring 106.

To the ends of the fork spring 106 is secured through a screw 107 the footrest plate 108 of the supporting member. The apex of the fork spring 106 is adapted to rock round a horizontal axis with reference to a bearing secured through the screw 111 to the shank 112 and constituted by two plates 109 and 110. Underneath the head of the screw 111 is simultaneously secured the apex of the suitably bent return spring 113 provided with a number of eyes.

Over the lower end of the spade shank 112 is fitted, in the case of Fig. 8, a comparatively rigid spiral spring 114 that is secured by means of a lug 115 that is held in position by a screw. The lower end of the spiral spring 114 is fitted over the projection 102 of the blade 101, the connection being operated again through a lug 116. Over the upper end of the tubular spade shank 112 is fitted a tube 118 rigid with a kind of bicycle handle bar 117. The latter is rigidly secured in a manner known per se in the desired position, through an elastically slotted cone or the like that is drawn by the clamping screw 119.

In the embodiment illustrated in Figs. 9 to 12, there is arranged, between the spade blade and the spade shank 112, instead of the coil spring 114 of the embodiment illustrated in Fig. 8, a forked spring 120 of round wire, the arms of which spring are parallel with one another. The apex of the fork spring 120 is secured to the shoulder 102 of the spade blade 101 through the screw 121. Any undesired shifting of the spade blade towards the right or the left of the shank is prevented through the agency of grooves, ribs or the like. The upwardly directed ends of the arms of the forked spring 120 are secured to the shank through the agency of the lower plate 110 urged against said shank 112 by the screw 111. In order to prevent any undesired rocking of the ends of the arms of the forked spring 120 round their longitudinal axes, said arms of the spring 120 are preferably flattened at their outer upper ends through grinding and they are caused to bear against corresponding flat surfaces of the plate 110 or of the parts of the spade shank 112 that lie in front of them.

Instead of the fork spring 120, it is possible to make use of a sufficiently strong blade spring that does not modify the side view of the spade as illustrated in Figs. 9 to 12.

In Figs. 10 to 12 is illustrated on a smaller scale the manner of operating a spade of the type shown in Fig. 9 in three different stages of operation. Fig. 10 is a side view of the spade with the spade blade engaging the ground before the rearward shifting of the blade shank. Fig. 11 illustrates the relative position of the parts of the spade, just before the tearing out of the clod through the springs tensioned by the rearwardly rocked spade shank. Fig. 12 is a view of the spade at the moment following the projection of the clod urged upwardly by the blade and that is just at about the upper point of its path.

The modification illustrated in Fig. 13 and Fig. 14 similar to the embodiment of Fig. 9 to a considerable extent and differs therefrom only through the fact that the arms of the fork-shaped spring 120 are provided each in the vicinity of the upper end of the spade blade 101 with an eye 122. This arrangement shifts the virtual axis of oscillation between the blade 101 and the shank 112 of the blade into the vicinity of the spade blade.

What I claim is:

1. A spade comprising a blade, a shank for said blade, a horizontal spindle pivotally connecting the blade to the shank to allow a relative rocking movement thereof, elastic members connecting the blade and the shank to urge them to a normal relative position when tensioned in use through a rearward movement of the shank with reference to the blade to store energy and to release same subsequently to project forwardly any clod cut by the space blade and stops for limiting said relative movement between predetermined angular positions of the shank with reference to the blade, a ground plate, and resilient means connecting said ground plate with said shank.

2. A spade comprising a blade, a shank adapted to rock with reference to the blade round an axis perpendicular to said shank and blade arrangement, elastic members connecting the blade and the shank to urge them to a normal relative position when tensioned in use through a rearward movement of the shank with reference to the blade to store energy and to release same subsequently to project forwardly any clod cut by the spade blade, a supporting member, and elastic means connected with the supporting member and said shank and urging the supporting member into its inoperative position on the rear side of the blade and shank arrangement.

3. A spade comprising a blade, a shank adapted to rock with reference to the blade round an axis perpendicular to said shank and blade arrangement, elastic members connecting the blade and the shank to urge them to a normal relative position when tensioned in use through a rearward movement of the shank with reference to the blade to store energy and to release same subsequently to project forwardly any clod cut by the spade blade and positive means for limiting the angular relative movement of the blade with reference to the shank within a range of 45°, a ground plate, and resilient means connecting said ground plate with said shank.

4. A spade comprising a blade, a shank adapted to rock with reference to the blade round an axis perpendicular to said shank and blade arrangement, at least one coil spring operating under compressional conditions connecting the blade and the shank to urge them to a normal relative position when tensioned in use through a rearward movement of the shank with reference to the blade to store energy, and to release same subsequently to project forwardly any clod cut by the spade blade, a ground plate, and resilient means connecting said ground plate with said shank.

5. A spade comprising a blade, a shank adapted to rock with reference to the blade round an axis perpendicular to said shank and blade arrangement, at least one coil spring submitted to a preliminary stressing connecting the blade with the shank to urge said parts to a relative position corresponding to that of a standard rigid shank and blade spade, when tensioned in use through the rearward movement of the shank with reference to the blade to store energy for subsequently projecting forwardly any clod cut by the spade blade, and bolts fastening the ends of the coil spring, a ground plate, and resilient means connecting said ground plate with said shank.

6. A spade comprising a blade, a shank adapted to rock with reference to the blade round an axis perpendicular to said shank and blade arrangement, and including a transverse member, elastic members connecting the blade and the shank to urge them to a normal relative position when tensioned in use through a rearward movement of the shank with reference to the blade to store energy and to release same subsequently to project forwardly any clod cut by the spade blade, a supporting member for the shank and blade and including a ground plate adapted to rest on the ground to the rear of the blade when the latter has engaged ground, said supporting member being adapted to rock round the transverse member on the shank, a coil spring connecting the transverse member with the ground plate on the supporting member and urging said transverse member away from the ground plate in antagonism with the rearward rocking movement of the shank with reference to the blade, the energy stored in the coil spring during said rearward movement cooperating subsequently in the thrust exerted on the clod cut out by the blade.

7. A spade comprising a blade, a shank, means to rock said shank with reference to the blade round an axis perpendicular to said shank and blade, elastic members connecting the blade and the shank to urge them to a normal relative position when tensioned in use through a rearward movement of the shank with reference to the blade to store energy and to release same subsequently to project forwardly any clod cut by the spade blade, a supporting member for the shank and blade including a ground plate adapted to rest on the ground to the rear of the blade when the latter has engaged ground, and a fork-shaped elastic member having a bight portion and engaging through said bight portion the shank to pivot thereon round a horizontal axis and carrying said ground plate, the bending of said fork-shaped member as obtained through the rearward rocking movement of the shank with reference to the blade storing energy in said fork-shaped elastic member for subsequent cooperation in the thrust exerted on the clod cut by the blade, and a transverse member rigidly connected with the blade and engaging the fork-shaped member for tensioning the portion of the latter extending to the ground plate before operation.

8. A spade comprising a blade, a shank, a short upper extension on the blade, at least one elastic member directly connecting the shank with the extension on the blade to allow the shank and blade to rock with reference to one another round a horizontal virtual axis parallel with the plane of symmetry of the blade and shank arrangement to urge said blade and shank into a normal relative position, said elastic member being adapted to be tensioned through a rearward movement of the shank with reference to the blade to store energy and to release same subsequently to project forwardly any clod cut by the spade blade, a supporting member for the shank pivotally connected thereto and including a fork-shaped elastic member pivotally secured through its bight portion to the shank whereby said elastic member rocks round a horizontal axis on said shank and a ground plate and foot rest member secured to the outer end of said fork-shaped member and a collar secured to the upper end of the extension on the blade and including a rearwardly directed support acting as a rest for the ends of the fork-shaped member.

9. A spade comprising a blade, a shank, a short upper extension on the blade, at least one elastic member directly connecting the shank with the extension on the blade to allow the shank and blade to rock with reference to one another round a horizontal virtual axis parallel with the plane of symmetry of the blade and shank arrangement to urge said blade and shank into a normal relative position, said member being adapted to be tensioned through a rearward movement of the shank with reference to the blade to store energy and to release same subsequently to project forwardly any clod cut by the spade blade, and means adapted to limit the angular shifting between the shank and blade and to prevent an exaggerated stressing of the elastic member, a ground plate, and resilient means connecting said ground plate with said shank.

10. A spade comprising a blade, a shank, a short upper extension on the blade, at least one elastic member directly connecting the shank with the extension on the blade to allow the shank and blade to rock with reference to one another round a horizontal virtual axis parallel with the plane of symmetry of the blade and shank arrangement to urge said blade and shank into a normal relative position, said elastic member being adapted to be tensioned through a rearward movement of the shank with reference to the blade to store energy and to release same subsequently to project forwardly any clod cut by the spade blade and a link system forming with the elastic member connecting the shank with the blade extension a polygon and adapted to prevent a relative rearward movement of the shank with reference to the blade beyond a predetermined angular position, a ground plate, and resilient means connecting said ground plate with said shank.

11. A spade, comprising a blade, a shank, a shoulder upon said blade, a fork-shaped collar member connected to said shoulder, a fork spring adapted to engage said collar member, a foot rest plate connected to said fork spring, plates connected with said shank adjacent the lower end thereof, said fork spring being connected with said plates, a tube having a lower end connected with the upper end of said shank, a handle bar connected with the upper end of said tube and a forked spring having an apex connected to said shoulder of the blade and upper arms connected to one of said plates.

12. A spade, comprising a blade, a shoulder upon said blade, a fork-shaped collar member connected to said shoulder and having arms comprising hoop-shaped outwardly flaring ends located behind the blade, a fork spring having a curved portion located in front of the blade and arms extending behind the blade and engaged by the ends of the arms of the collar member, a foot rest blade located behind the blade and firmly connected with the arms of said fork spring, a shank extending vertically above said blade, a spring interconnecting said shank and said blade, a bearing secured to the front of said shank, the curved portion of said fork spring having an apex secured to said bearing and adapted to rock about a horizontal axis extending in front of said blade and said shank, a return spring connected to said bearing and located in front of said blade, a tube having a lower end connected with the upper end of said shank, and a handle bar connected with the upper end of said tube.

References Cited in the file of this patent

UNITED STATES PATENTS

| 943,325 | Stewart | Dec. 14, 1909 |

FOREIGN PATENTS

| 560,616 | France | Jan. 3, 1923 |
| 328,078 | Italy | July 25, 1935 |
| 642,839 | Germany | Mar. 17, 1937 |
| 468,250 | Belgium | Oct. 1, 1946 |
| 263,869 | Switzerland | Dec. 16, 1949 |